(12) United States Patent
Reich et al.

(10) Patent No.: US 9,326,531 B1
(45) Date of Patent: May 3, 2016

(54) MULTI-OUTLET SOFT FROZEN DESSERT APPARATUS FOR A SELF-SERVICE RESTAURANT

(71) Applicants: Daniel Reich, Tucson, AZ (US); Vladimir Reich, Tucson, AZ (US)

(72) Inventors: Daniel Reich, Tucson, AZ (US); Vladimir Reich, Tucson, AZ (US)

( * ) Notice: Subject to any disclaimer, the term of this patent is extended or adjusted under 35 U.S.C. 154(b) by 0 days.

(21) Appl. No.: 14/595,214

(22) Filed: Jan. 13, 2015

(51) Int. Cl.
*A23G 9/28* (2006.01)
*A23G 9/22* (2006.01)
*A23G 9/16* (2006.01)
*A23G 9/18* (2006.01)

(52) U.S. Cl.
CPC *A23G 9/28* (2013.01); *A23G 9/222* (2013.01); *A23G 9/16* (2013.01); *A23G 9/18* (2013.01)

(58) Field of Classification Search
CPC ........... A23G 9/14; A23G 9/16; A23G 9/163; A23G 9/166; A23G 9/20; A23G 9/225; A23G 9/227; A23L 35/375; F25B 5/00–5/04; F25C 1/00; F25C 1/10
USPC .............. 62/68–71; 222/146.6, 413; 426/231, 426/519, 524
See application file for complete search history.

(56) References Cited

U.S. PATENT DOCUMENTS

| | | | | |
|---|---|---|---|---|
| 1,710,648 | A | * | 4/1929 | Thompson .................... 165/156 |
| 3,452,555 | A | * | 7/1969 | Thurman et al. ................. 62/298 |
| 3,995,770 | A | * | 12/1976 | Schwitters ....................... 222/56 |
| 5,018,363 | A | * | 5/1991 | Aoki et al. ....................... 62/135 |
| 5,158,506 | A | | 10/1992 | Kusano et al. |
| 5,419,150 | A | * | 5/1995 | Kaiser et al. .................... 62/342 |
| 6,490,872 | B1 | * | 12/2002 | Beck et al. ........................ 62/66 |
| 6,637,214 | B1 | * | 10/2003 | Leitzke et al. ..................... 62/68 |
| 2003/0150227 | A1 | * | 8/2003 | Ross et al. ...................... 62/188 |
| 2009/0078724 | A1 | * | 3/2009 | Lamb et al. .................... 222/608 |
| 2012/0145246 | A1 | * | 6/2012 | French et al. ..................... 137/1 |
| 2014/0209635 | A1 | * | 7/2014 | Gates et al. ................. 222/144.5 |
| 2014/0305618 | A1 | * | 10/2014 | Newton et al. ................ 165/154 |

FOREIGN PATENT DOCUMENTS

GB           1310993 A  *  3/1973  ............... A23G 9/20

* cited by examiner

*Primary Examiner* — Marc Norman
*Assistant Examiner* — Antonio R Febles
(74) *Attorney, Agent, or Firm* — Morgan Law Offices, PLC (57) ABSTRACT

A multi-outlet soft frozen dessert apparatus for a self-service restaurant with multiple freezers attached to the wall dividing the client area of the restaurant from the kitchen area is provided. The freezers of apparatus may include an evaporation tube comprised of an aluminum alloy micro-channel parallel flow extruded tape. The mix vats of the apparatus may include circulating water in a hydraulic system having added antifreeze to suppress a freezing temperature in the range of $-2°$ C. to $-5°$ C. to assure adequate approach temperature to cool a mix in the mix vat. The apparatus may include scrape blades mounted on a helical part of the beater-scraper that scrape a thin layer of ice crystals from an internal surface of the inner cylinder and fold the ice crystals inside the mix bulk.

11 Claims, 5 Drawing Sheets

MULTI-OUTLET SOFT FROZEN DESSERT APPARATUS FOR A SELF-SERVICE RESTAURANT

BACKGROUND OF THE INVENTION

1. Field of the Invention

The present invention relates to a soft-frozen desert apparatus designed specifically for self-service restaurants, eliminating the shortcomings of using traditional soft-serve self-contained frozen desert machines designed for an over-the-counter mode of operation.

2. Description of the Related Art

Conventionally, self-service restaurants and cafes use the soft-serve frozen dessert machines designed specifically for over the counter operations. Soft-serve machines are installed in the service room with their fronts facing the window-ports in the wall between the service and client areas. The fronts of the machines contain the dispensers and the control and monitor ring panels which are accessible to the clients through the window-ports. An example of such a machine may be found in U.S. Pat. No. 5,158,506 to Kusano et al.

Such restaurants are essentially divided into two spaces: client rooms and service rooms.

The machines for producing soft-serve frozen dessert, such as soft-serve ice cream and/or yogurt, may produce one or more flavors of the product. The most popular machines provide two flavors (e.g., vanilla and chocolate) and a mix of the original flavors. To produce each flavor the machine is equipped at least with a reservoir or a hopper for liquid mix, a cylindrical freezing barrel or a freezer and a low temperature refrigeration system. Most machines also have a medium temperature refrigeration system for keeping the liquid mix in the hopper at a safe temperature in the approximate range of 2° C. to 5° C. Liquid mix is either gravity-fed or pumped into the receiving chamber of the freezer. Air is injected into mix flow at a desired proportion. A geared motor rotates a shaft extending through the center of the freezer. A beater and a series of scrapers are mounted on the shaft. The beater mixes the liquid with air producing foam. The freezer is cooled by the coil, wounded-on the external surface of the freezer, to the temperature adequate to fast freeze a thin layer of foam touching the internal surface of the cylinder to the temperature considerably below the goal temperature of the product in the approximate range of −6.5° C.--8° C. The rotating scrapers skim the frozen mix from the surface of the cylinder and fold it into the warmer mix in the center area of the freezer where it is mixed with warmer mix achieving optimal product temperature in the approximate range of −6.5° C.--8° C. At the same time, the mix is propelled by the beater longitudinally through the freezing cylinder towards the dispensing head. The rotating beater also facilitates to build-up pressure in the dispensing chamber of the freezer that is adequate to create flow of the product when the dispensing valve is open.

Each machine, in most cases, has two hoppers and two freezers for producing two flavors of the product. Also machines may have a third dispenser for providing a mix of two original flavors. The machines are self-contained. They have all the refrigeration equipment to provide freezing the barrels of the freezers and cooling the mix in the hoppers to the safe temperatures (in the range of approximately 2° C. to 5° C.).

Such machines have multiple shortcomings when utilized in restaurants utilizing the self-service business model of operation.

The refrigeration capacity of each machine is selected to meet the requirement of cooling of the freezers and hoppers at the most demanding periods when the machines are started with warm mix in the hoppers and the freezers. Most of the time during normal operation, the cooling requirements are considerably lower to just freeze the new portion of the mix entered the freezer after the product is dispensed and compensate the heat gain from the environment. Those times require considerably lower freezing and cooling capacity. The machines balance the drop in refrigeration demand by cycling the compressors, in other words, employing the pulse width modulation or PWM technique. This technique, when applied to alternating current or AC motor driven compressors, is very energy inefficient. Moreover it sharply reduces the longevity of the compressors. Also the power demand of the whole installation is equal to the sum of the rated powers of all of the machines. In some cases this demand exceeds the available kW capacity of the desired location of the restaurant, limiting the business opportunity.

The air conditioning system, serving the installation must be sized with consideration of the total rated demand of all the machines, which may considerably increase the cost of the construction and in some cases makes the installation impossible.

Efficiency of any refrigeration system depends on "temperature lift": the difference between the condensing temperature of the condenser and evaporating temperature of the evaporator. The lower the lift, the higher the efficiency. The condensing temperature equals the sum of the temperature of the cooling environment of the service area air temperature and the approach temperature. For example, if the kitchen temperature is approximately 25° C. and the approach temperature is approximately 15° C. then the condensing temperature is approximately 40° C. If the required temperature on an internal surface of the freezer barrel is approximately −20° C. and the freezer approach temperature is approximately 15° C. then the evaporation temperature is approximately −35° C. The temperature lift in this example is approximately 75° C.

To achieve the lower approach temperature it is necessary to increase the heat exchange surfaces which may be done by increasing the size or the condensing heat exchanger and the number of refrigeration coil rows (for air cooled exchanges) and velocity of the cooling media, which may be air or water. The existing self-contained soft service machines just do not have room to do that. In case of air cooled machines they usually have just one radiator with multiple condensing coils attached to it and a single fan.

The heat exchanges of the freezer cylinders prevailing in the industry are comprised of copper tubing with an internal diameter of approximately 5 mm winded and brazed on the external surface of the cylinder. Expanded refrigerant flows through the tubing and evaporates at temperatures in the range of approximately −35° C. to −20° C. The evaporating temperature depends on the total heat transfer coefficient between the refrigerant and the layer of the mix contacting the inside wall of the cylinder. A major component of the total heat transfer resistance depends on the efficiency of heat transfer between the refrigerant and the internal surface of the copper tubing. When the refrigerant enters the heat exchanger its quality is in the range of approximately 25% to 35%. At these conditions the refrigerant comprises small droplets of liquid suspended in saturated gas. Gas has a very low heat transfer coefficient so the heat transfer from the internal surface of the tubing to the droplets inside is greatly inhibited. Primarily the heat transfer occurs between a thin layer of refrigerant condensed on the internal surface of the tubing and the tubing. So the intensity of heat exchange increases when the ratio of the internal perimeter of the cross-section of the tubing to its area drops. So using the traditional design of the freezer heat exchanges leads to high approach temperatures between the refrigerant and the mix and, as a result, to lower efficiency.

Both inefficient designs of the condenser and the freezer lead to inherently low thermodynamic efficiency of the self-contained machines on the market.

The machines in self-service operations are usually installed in one row close to each other so the air inlet of one machine is facing the hot air outlet of the other. As a result, the cooling air temperature of the condenser may well exceed the environment temperature which causes further detrimental effect on the efficiency of the machine.

The machines are usually equipped with small compressors with inherently low isotropic efficiency. Moreover these compressors are driven by single phase permanent split-capacitor or PSC motors with inherently low efficiency (below approximately 60% in comparison to more than approximately 90% for three-phase motors).

One of the most expensive parts of a soft-serve machine is the stainless steel cabinet. The expensiveness of the cabinet may be explained by the high cost of the stainless steel as well as relatively small manufacturing batches which may not justify the use of highly expensive automated stamping machinery and tooling. Most parts of the cabinet are located behind the wall dividing the service and client areas and are not seen by clients. Getting rid of these enclosures may significantly reduce the manufacturing cost of the machines.

Most soft-serve machines utilized in self-service restaurants have three spigots: two spigots for the flavors produced by the machine and one for the mix of them. These spigots are located very close to each other so when a client uses a machine to dispense one flavor, the other spigots is not accessible for anyone else. As a result, the efficiency of the business in the period of high demand may be drastically reduced.

The control and monitoring panels of the machines are located on the client side. In case of any fault or warning message on the monitoring panel, the service personnel must at least temporarily restrict client access to this machine until the problem is resolved. In some operations, for example, resetting the safety relays requires access to the back as well as the front of the machine. The client doesn't need any information or control of the machine accept of operating the levers of the spigots, so location of the control and monitoring panel on the front of the machines is pointless.

The conventional soft service machines have two major types of hoppers: gravity and pump fed. Gravity fed hoppers are located above the freezers so the gravity may drive the liquid mix together with air from the hoppers into the freezers. High location of the hoppers creates considerable difficulty in loading and servicing the hoppers. To more efficiently utilize the very limited space inside the machines, the hoppers have a rectangular shape. The cooling of the mix is done by refrigeration coils wounded around the vertical walls of the hoppers. As a result, the cooling of the liquid is inhomogeneous. Temperature of the liquid in the central part of the hopper may exceed the safe limit while the liquid in the corners may be frozen. The other shortcoming of the gravity hoppers is inconsistency of overrun (the measure of the quantity of air in the product). The overrun strongly depends on the level of the liquid mix in the hopper. The overrun increases when the level drops causing detrimental effect on the quality of the product.

In the pump fed systems, the hoppers may be located close to the bottom of the machine in a specially refrigerated compartment. A pump draws the liquid from the hopper, mixes it with air and injects the foam into the freezer. Such systems allow keeping overrun considerably more stable, increasing the product quality. Also they are easier to refill and service. They are more expensive in comparison to the gravity fed systems. The other drawback of a pump fed system is difficulty of priming (initial filling the cylinder with mix foam). Most machines utilizing pump fed systems have a manual valve which must be open to allow the air out of the freezer until it is completely full with foam mix.

Sanitary regulations require regular cleaning the freezers and the hoppers of each machine. Each freezer, dispensing door, and hopper must be disassembled, cleaned using special, expensive solutions, washed, lubricated and assembled again. It is a very time consuming operation, requiring well-trained staff. The alternative to the cleaning may be pasteurization where all parts which may be in contact with the mix are subjected to heating to approximately 80° C. There are on the market machines which are capable of doing that by reversing the refrigeration cycle so the cooling coil in the freezer becomes the condenser and the compressor compresses the refrigerant gas to high pressure and temperature. Such machines tend to be much more expensive than conventional ones and are rarely utilized in self-service restaurants.

Therefore it would be desirable to have an apparatus specially designed for a self-service model of business operation, that doesn't have all the shortcomings of conventional machines and at the same time drastically reduces the cost of the business.

SUMMARY OF THE INVENTION

The present invention provides a multi-outlet soft frozen dessert apparatus optimized for restaurants with a self-service model of business which overcomes the aforementioned problems and at the same time reduces the cost of starting and running the business. In accordance with the first aspect of the present invention, the wall dividing the client and service rooms of the restaurant has multiple window-ports. The freezers of the apparatus are installed on the brackets which in turn are directly attached to the wall in such a manner that the cylinders protrude horizontally inside the service space and the product dispensing parts of the freezers are located primarily inside the window-ports facing the client space. The horizontal distances between the freezers and their height relative to the floor are selected to provide the adequate convenience for the customers for interacting with the freezers.

In accordance with other aspects of the present invention, all freezers share a single refrigeration condensing unit with one or more compressors, a condensing heat exchanger, a receiver, an expansion valve and a distributor. Each freezer has its own solenoid valve installed in the thermally insulated supply line connecting the distributor to the freezer. A return line associated with each freezer is connected to the manifold with a single suction line connected to the suction port(s) of the compressor(s). Total hydraulic resistance of the refrigeration lines between the distributor and the manifold are made essentially equal by manipulating the tubing lengths, their diameters and/or installing calibrated restrictors (orifices, capillary tubing) in the lines.

The compressor(s) compresses the cold, low pressure expanded vapor of the refrigerant removed from the freezers into a hot, high pressure gas which is transported through the check valves to the inlet of the condensing heat exchanger. The condensing heat exchanger cools the gas converting it into liquid. The liquid then moves into the receiver and from there to the expansion valve. Partly expanded and cooled in the valve, refrigerant moves into the distributor which equalizes the flow of the refrigerant among the heat exchanges of the active freezers. There the refrigerant evaporates further removing the heat from the freezers and cooling the mix. When the viscosity of the product measured by the current sensor installed on a power wire feeding the beater motor inside a freezer reaches the set point, the system controller deactivates the associated valve stopping the refrigerant flow through the freezer heat exchanger. The control system activates the valve back when a new portion of warm liquid mix is injected into the freezer due to withdraw of the product through the dispenser of the freezer. A temperature sensor installed on the suction line of the compressor(s) measures the suction temperature and the control system controls the expansion valve to keep the suction temperature adequate for achieving the lowest evaporation set point among all the freezers. Alternatively an automatic thermal expansion valve or TXV may be used.

When the condenser has variable capacity by having multiple compressors connected in parallel and/or a variable capacity compressor the control system controls the capacity to be adequate to provide just enough refrigerant flow to satisfy the cooling requirements of active freezers. Start-up process of the machine (when the freezers are primed with the mix and then cooled to the product set point) may be performed consequentially one or a small group of freezers at a time. These strategies may drastically reduce the size and the power demand of the apparatus.

Yet in accordance with another aspect of the present invention, the freezer cylinder heat exchanger is comprised of micro-channel extruded tubing wounded on the external surface of the cylinder. Such extrusions are widely utilized in manufacturing heat exchangers for automobiles. Air conditioning industry is also starting to use this technology to achieve higher efficiency of the equipment. The extruded tubing has manifolds brazed on both ends. The manifolds are connected to supply and return tubes. To provide better heat exchange between the heat exchanger and the cylinder of the freezer, the tubing is wounded-up on a die smaller in diameter than the cylinder, and then is moved to the cylinder lubricated with heat conducting grease.

Another object of this present invention is to provide a mix vat for holding the mix. The mix vat may be installed under the freezer from where the mix is pumped into a receiving chamber of the freezer precisely aerated on the way to the receiving chamber.

According to one aspect of the present invention, to resolve the problem of priming the freezing cylinder, a vent is installed at the very top of the receiving chamber of the cylinder. The vent is implemented as a short pipe; a part of the whole pipe is made of a transparent material such as glass or polycarbonate. At the top of the vent, a normally closed solenoid valve is installed. Below the valve on the transparent part of the pipe an optical slot type sensor is mounted.

Priming the freezer starts with opening the vent solenoid valve and starting the pump. When the mix foam is pumped into the cylinder, it pushes the air out of the cylinder through the vent. When the cylinder is full, mix foam enters the transparent part of the vent and blocks light emitted from one side of the sensor. The photo transistor on the other side of the sensor changes the state generating a signal to the control system, which in turn generates the command to the solenoid valve to close. The pump stays on until the pressure in the cylinder builds-up to the set point value. At this moment the current sensor installed on a wire feeding the pump generates (corresponding to the set point) a signal to the controller which in turn turns the pump off.

According to one aspect of the present invention, the mix vat comprises of two pots, one slightly larger than the other. The smaller pot is located inside the larger one concentrically in such a manner that a gap is formed between the pots. The smaller pot rests on the bottom of the large one on standoffs. The gap is made essentially uniform. At the top of the larger pot the gap is sealed with a gasket. A drain is located at the center of the bottom of the larger pot. At the bottom of the gasket one or more nozzles are welded in the larger pot in essentially a tangential manner. All the external surfaces of the larger pot are thermally insulated. The mix vat has a thermally insulated cover with a penetration for the mix suction tube. The mix vat is installed on a dolly for ease of moving the mix vat for refilling and cleaning.

Cooling liquid is injected through the nozzle(s) into the gap between the pots and moves there on the helical trajectory to the bottom gap where it moves on the spiral trajectory towards the drain and out of the mix vat. The helical and spiral trajectories increase the heat exchange coefficient between the coolant and the walls of the pots. The cylindrical shape of the mix vat also facilitates the convection inside the mix and as a result increases uniformity of the temperature distribution of the mix. Treated water or water—antifreeze solution may also be utilized as the coolant.

Instead of cooling liquid, hot water may be injected in the nozzles of the mix vat with the purpose of heating the contents of the mix vat.

According to one more aspect of the present invention a positive displacement pump is installed in the line connecting the suction line of the mix vat and the inlet of the receiving chamber of the freezer. Close to the inlet of the pump a tee is installed in the line. Side branch of the tee is connected to a precision valve. The other side of the valve is connected to the atmosphere. Somewhere upstream from the tee a check valve is installed in the suction line.

When the pump starts it creates a negative pressure in the tee. Due to this negative pressure a pressure differential is created which draws liquid from the vat as well as air from the atmosphere. The proportion of liquid and air (overrun) may be regulated by the precision valve. The check valve prevents liquid below the tee falling back into the vat when the pump is stopped.

BRIEF DESCRIPTION OF THE DRAWINGS

For further understanding of the disclosure, reference will be made to the following detailed description of the present invention, which is accompanied with the following drawings.

DETAILED DESCRIPTION OF THE INVENTION

Frozen dessert may constitute by the way of example, but not limited to, soft-serve ice cream, ice milk, yogurt, custard, carbonated and/or non-carbonated ice slush drinks. The multi-outlet soft frozen dessert apparatus 100 may be capable of producing and dispensing to the customers any combinations of the frozen dessert types and flavors simultaneously. The multi-outlet soft frozen dessert apparatus 100 in accordance with the present invention may generally comprise of the following parts: at least two semi-independent stations 100A distributed along a wall 101 dividing the client and service areas of a restaurant; the semi-independent station 100A may be manipulated by a customer to dispense soft frozen dessert, a single, condensing unit 300A, an expansion valve 304 and a partially expanded refrigerant distributor 305, a hydraulic system 500 for mix temperature management, and a control system 120.

Figure 1:
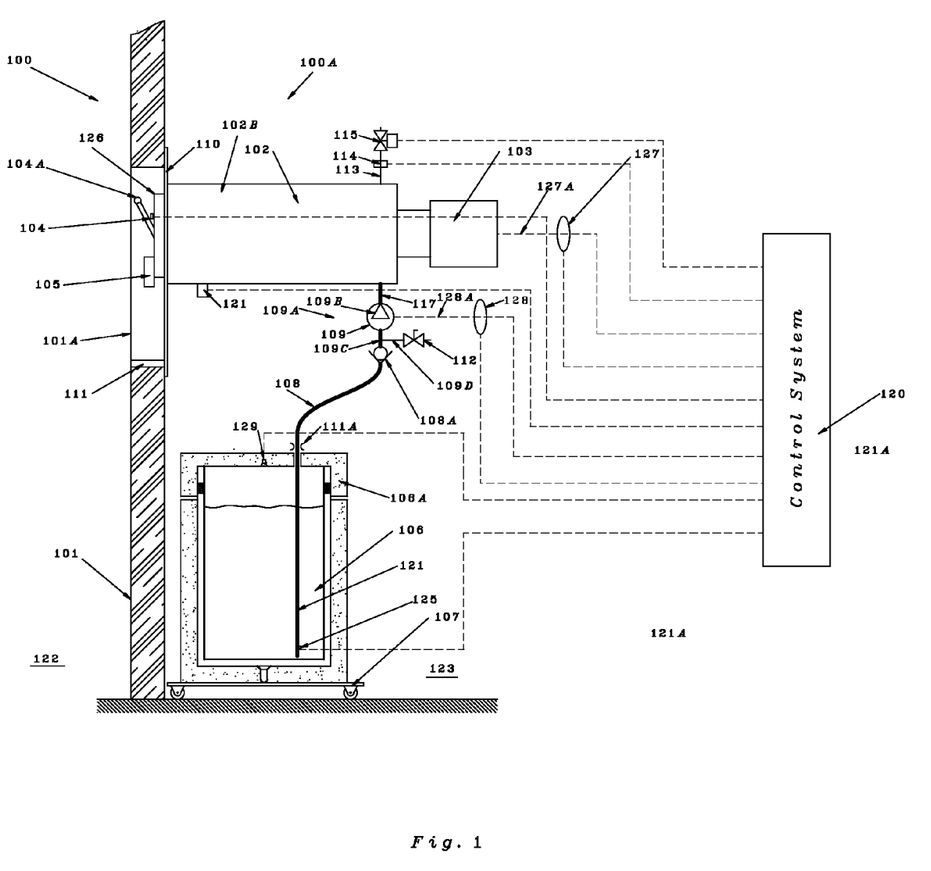
FIG. 1 is a diagram illustrating an exemplary embodiment of a single station of the multi-outlet soft frozen dessert apparatus for a self-service restaurant embodying the present invention.

Referring initially to FIG. 1, there is depicted schematically the exemplary embodiment of a semi-independent station 100A of the multi-outlet soft frozen dessert apparatus 100 for a self-service restaurant embodying the present invention. In the depicted embodiment, the semi-independent station 100A may include a freezing cylinder 102 mounted on a bracket 110 which, in turn, may be mounted on a wall 101 which divides a service area 123 from a customer area 122. The product dispenser 126 may have a dispensing lever 104 and a spigot 105 which may be located in a window-port 101A of the wall 101. The window-port 101A may have a drip pan 111. A geared motor 103 may be mounted on the back of the freezing cylinder 102 for rotating a beater-scraper (FIG. 2A, 206) inside the freezing cylinder 102. The rear bottom of the freezing cylinder 102 may have a mix inlet connector 117 for delivering mix to the freezing cylinder 102. The rear top of the freezing cylinder 102 may have an air vent tube 113 for purging the air during the priming of the freezing cylinder 102. A temperature sensor (FIG. 2A, 121) may measure product temperature in the dispensing compartment (FIG. 2A, 121A) of the freezing cylinder 102 and may transmit the temperature measurement to the control system (FIG. 1, 120). A proximity sensor 104 installed on the product dispenser 126 may signal to the control system 120 when the customer starts and stops the dispensing of the product. A current sensor 127 installed on one of the power wires 127A powering the gear motor may measure the current of the geared motor 103 and report the measurement to the control system 120. The current is essentially a function of the viscosity of the product, so the value of the viscosity of the product may be represented as a value of the current. When the current reaches the set point, the control system 120 may issue a command to stop flow of the refrigerant through the evaporator of its freezing cylinder 102 and stop the geared motor 103.

The mix vat 106 may be located below the freezing cylinder 102. The mix vat 106 may be installed on a dolly 107 for ease of moving the mix vat 106 for filling with the mix, washing and maintenance. A cover 106A of the mix vat 106 may have an ultrasonic or microwave mix level sensor 129, which may report the measurement information to the control system 120.

A mix delivery system 109A of the semi-independent station 100A may be comprised of a positive displacement pump 109, for example, a peristaltic pump 109B installed on the feeding tube 108. The current sensor 128 may be installed on one of the wires 128A powering the positive displacement pump 109 which may measure the current feeding the positive displacement pump 109, which may be correlated with the pressure of the mix at the output of the positive displacement pump 109 and inside the freezing cylinder 102. When the dispensing lever 104 may be pulled and the proximity sensor 104A reports this event to the control system 120 and the product may be flowing from the freezing cylinder 102, the control system 120 starts the displacement pump 109 and the positive displacement pump 109 starts refilling the freezing cylinder 102 with the mix from the mix vat 106. When the current drawing by the pump 109 measured by the current sensor 128 reaches the set point, the control system 120 may turn the positive displacement pump 109 off. The positive displacement pump 109 may start when the priming process may be initiated by the control system 120. Upstream of the positive displacement pump 109, a tee 109C may be installed. The side connector 109D of the tee 109C may be connected to an air intake regulator 112. The air intake regulator 112 may be implemented in ways that may allow precise control of overrun of the product. In the current embodiment of the present invention, the regulator may be implemented as a precision needle valve which allows precise control of resistance to the air flow from the atmosphere into the stream of the mix. Pressure of the mix entering the tee 109C may be defined by the flow rate of the mix in the feeding tube 108, its hydraulic resistance and vertical distance between the tee 109C and the surface of the mix in the mix vat 106. By adjusting a restrictor 111A, the resistance of the feeding tube 108 may be made high enough so the influence of the change in the vertical distance on the overrun value may be acceptable and overrun may be controlled just by adjusting the resistance to the air flow through the air intake regulator 112. Upstream from the tee 109C in the feeding tube 108, a check valve 108A may be installed which allows the flow of the mix in the feeding tube 108 only out of the mix vat 106 and prevents mix dropping from the feeding tube 108 back into the mix vat 106 when the positive displacement pump 109 may be off. The check valve 108A may be installed anywhere along the feeding tube 108 including a tip of the feeding tube 108. The outlet of the positive displacement pump 109 may be connected to the mix inlet connector 117 located at the bottom of the receiving chamber (FIG. 2A, 216) of the freezing cylinder 102. The air vent tube 113 may be located at the top of the receiving chamber (FIG. 2A, 216) and may be terminated with a solenoid valve 115. A part of the air vent tube 113 may be made transparent and an optical sensor 114 may be installed on the air vent tube 113. The optical sensor 114 may provide the control system 120 with a signal when the mix foam reaches the optical sensor 114. In response, the control system 120 may command the solenoid valve 115 to close. The ultrasonic or microwave mix level sensor 129 may be installed on the cover of the mix vat 106 and may provide the control system 120 with a measurement of the level of the mix in the mix vat 106. This information may be utilized by the control system 120 for reporting the level to service personnel, for warning the service personnel to refill the mix vat 106, inventory of the mix, etc.

Figure 2A:
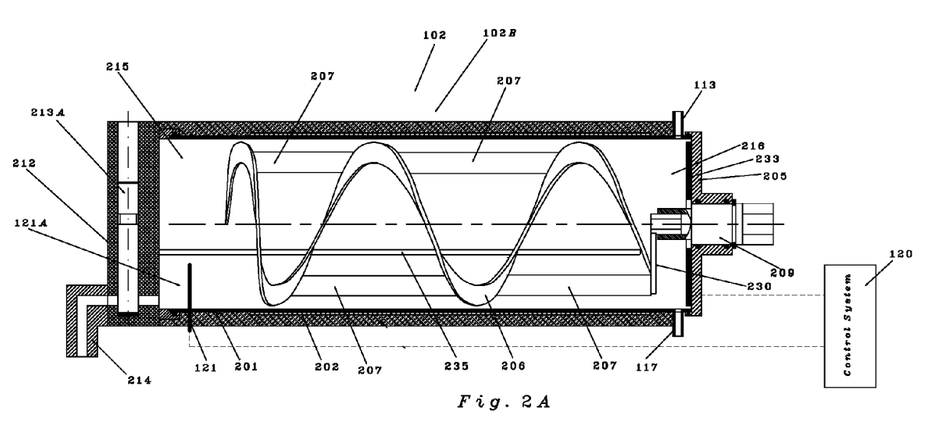
FIG. 2A is a sectioned side elevation view of the freezing cylinder in the accordance with the present invention.
Figure 2B:
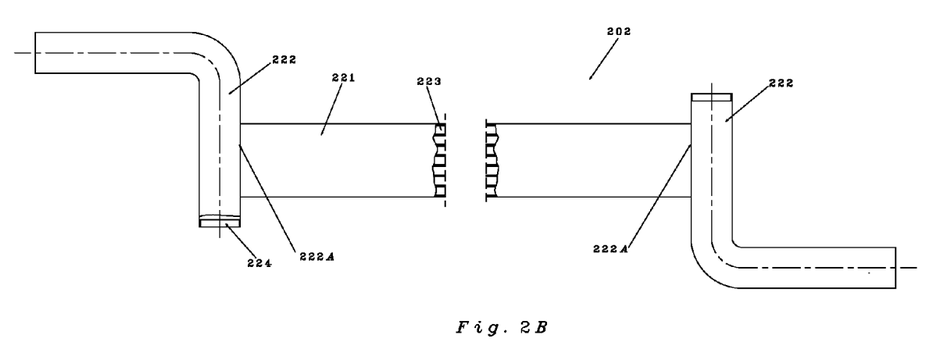
FIG. 2B is a view of the implementation of the evaporator of the freezing cylinder of FIG. 2A before it is wound on the barrel of the freezer.

The freezing cylinder 102 or freezer 102B is depicted in more details in FIG. 2A and FIG. 2B. The freezing cylinder 102 may include an inner cylinder 201 and an evaporator tube (FIG. 2B, 202) that may be tightly wounded on the external surface of the inner cylinder 201. The evaporator tube 202 may be comprised of an extruded tape 221 which may be an aluminum alloy micro-channel parallel flow extruded tape or the like. The evaporator tube 202 may have headers 222 brazed to both ends of the evaporator tube 202. Headers 222 may be made of cylindrical tubing and have slots 222A through which the extruded tape 221 may be inserted inside the headers 222 before brazing. One of the ends of both headers 222 may have brazed-in plugs 224. The other ends of the headers 222 may be bended for ease of connecting the headers 222 to one or more refrigeration lines (not shown). The extruded tape 221 may have multiple small channels 223. To make the heat flow between the evaporator tube 202 and the inner cylinder 201 better, the extruded tube 221 may be wounded-up on a mandrel with the diameter slightly smaller than the external diameter of the inner cylinder 201. The extruded tube 221 may be forced on the inner cylinder 201 greased with heat conducting paste creating contact pressure between the heat exchanger and the inner cylinder 201. Aluminum alloy has higher thermal expansion than stainless steel, so when the assembly may be cooled to low temperatures, the contact pressure further increased increasing the heat conductance.

The rear end of the inner cylinder 201 may have an end cap 205 with an opening for a shaft 209 which may transmit the rotation from the geared motor (FIG. 1, 103) to a beater-scraper 206 through the crank 230. The front end of the inner cylinder 201 may be sealed with a removable door 212 with a dispensing valve 213A and spigot 214. The dispensing chamber 215 inside the inner cylinder 201 may accumulate the product; the area in the vicinity of the rear end cap may be called a receiving chamber 216. A plurality of scrape blades 207 may be mounted on a helical part of the beater-scraper 206 in a manner that may scrape a thin layer of ice crystals from the internal surface of the inner cylinder 201 and fold the ice crystals inside the bulk of the mix in the cylinder. The baffle 235 may inhibit rotation of the mix inside the beater-scraper 206. The rotating beater-scraper 206 may create a pressure differential along a freezing cylinder axis which forces the mix moving backward to the end cap, so a mix rotating pattern in the longitude direction may be established. If the mix temperature may be still above freezing, the ice crystals may be melted gradually allowing the temperature of the mix below the freezing point. After that, the crystals may be accumulated and the viscosity of the mix as well as the current measured by the current sensor (FIG. 1, 127) increases. When the current reaches the set point, the refrigerant flow through the evaporator tube 202 may be terminated and the geared motor 103 may be turned off by the control system 120. At that moment the product may be ready for withdrawal. When a customer pulls the dispensing lever 104, the proximity sensor 104A may signal the control system 120 to start the geared motor 103 and open the flow of the refrigerant through the evaporator tube 202 and may start the positive displacement pump 109. The beater-scraper 206 may build-up pressure in the dispense chamber 215 and the product may start flowing through the spigot 105. The positive displacement pump 109 may refill the freezing cylinder 102 with new mix foam.

On the inner side of the end cap 205, a heating disk 233 may be installed. The heating disk 233 may be made of materials such as ceramics, film, etc. The heating disk 233 may be energized when pasteurization of the mix or cleaning solution may be necessary to satisfy the sanitary requirements. When the heating disk 233 and the geared motor 103 may be energized, the rotating beater-scraper 206 may induce flow in the mix in a circular pattern: on the periphery of the inner cylinder 201, mix may be forced by the beater-scraper 206 moving from the heating disk 233 to the front of the inner cylinder 201 and then through the central part of the inner cylinder 201 back to the heating disk 233 and so on removing heat from the heating disk 233 and distributing it through the whole volume of the mix in the inner cylinder 201. The temperature sensor 121 may measure the temperature inside the inner cylinder 201 and when the temperature reaches the pasteurization set point, the control system 120 may turn-off the heater 233 and the geared motor 103.

Figure 3:
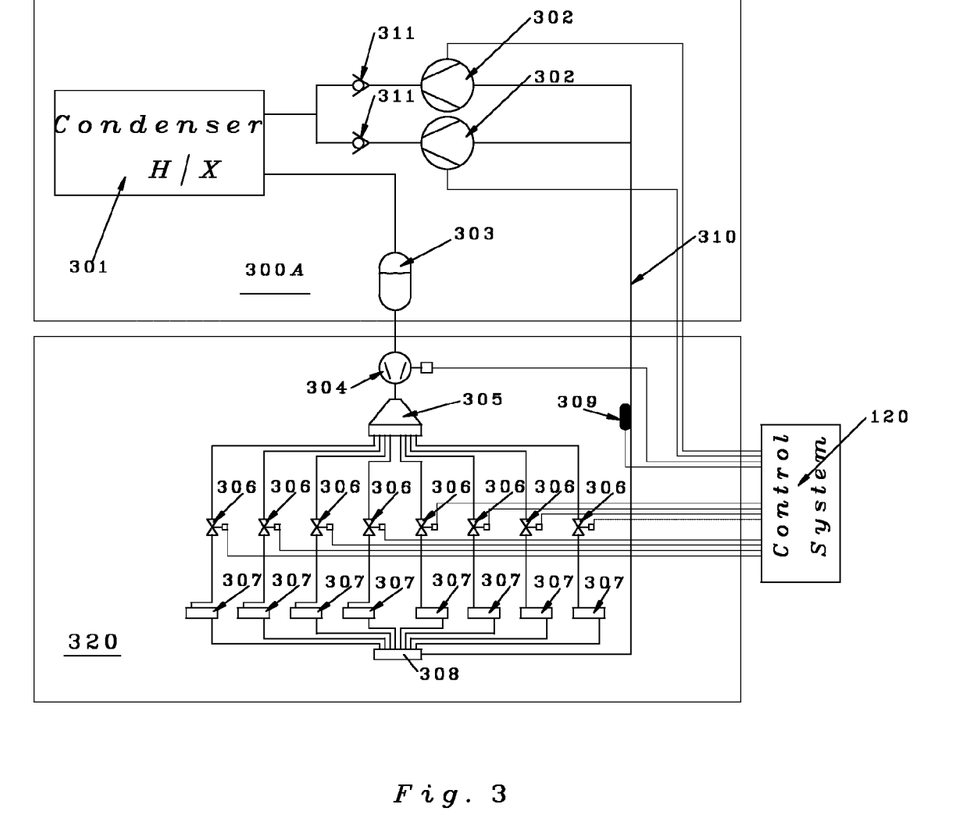
FIG. 3 is a schematic diagram of the exemplary embodiment of the refrigeration circuitry of the multi-outlet soft frozen dessert apparatus for a self-service restaurant of the present invention.

FIG. 3 depicts the condensing and the refrigerant distribution system of the multi outlet soft frozen dessert apparatus 300 of the present invention. Generally it may comprise two subsystems: the condensing unit 300A and the refrigerant expansion and distribution system 320.

The condensing unit 300A may comprise at least one compressor 302, a condensing heat exchanger 301, a plurality of check valves 311 (in case of multiple compressors) and a liquid refrigerant receiver 303. There may be two compressors 302; each compressor may have cooling capacity adequate to cool one freezer 307. The condenser unit 300A may be air or water cooled. An air cooled condenser may be installed remotely on the roof or on the ground outside the restaurant. A water cooled condenser may be installed in the service area on the floor or suspended from the ceiling. It may be a regular off-the-shelf condensing unit widely utilized in the commercial frozen food storage units.

A refrigerant expansion and distribution system 320 may include an expansion valve 304 such as a TXV or a thermal expansion valve or an EXV or an electronic expansion valve with a temperature sensor 309 installed on the suction line 310 of the compressor(s) 302, an expanded refrigerant distributor 305, and solenoid valves 306, located in the thermally insulated lines connecting the freezing cylinders 307 to the refrigerant distributor 305. After complete expansion in the freezing cylinders 307, the refrigerant may flow through the individual refrigeration lines into a collector 308 and from there through the suction line 310 into the suction port(s) of the compressor(s) 302. To equalize the flow rate of the refrigerant between active freezers, the hydraulic resistance of each branch between the refrigerant distributor 305 and the collector 308 may be made essentially equal, for example by making the tube lengths and diameters equal. A temperature sensor 309 may be installed on the suction line 310 which through the control system 120 or through a gas line (not shown) controls the opening of the expansion valve 304 to maintain the suction temperature at the set point. The control system 120 may be programmed to allow opening only the number of the solenoid valves so the refrigerant flow at any time wouldn't exceed the capacity of the condensing unit 300A. The strategies for controlling the solenoid valves 306 as well as the expansion valve 304 will be discussed in details below. The content (FIG. 4) of the internal pot 401 may be cooled or heated by a pump (FIG. 5, 502) feeding the chilled or hot water to the jackets of the mix vats 106. Each mix vat 106 may have a balancing valve 503. Water may have some antifreeze to lower the freezing temperature slightly below approximately 0° C.

Figure 4A:
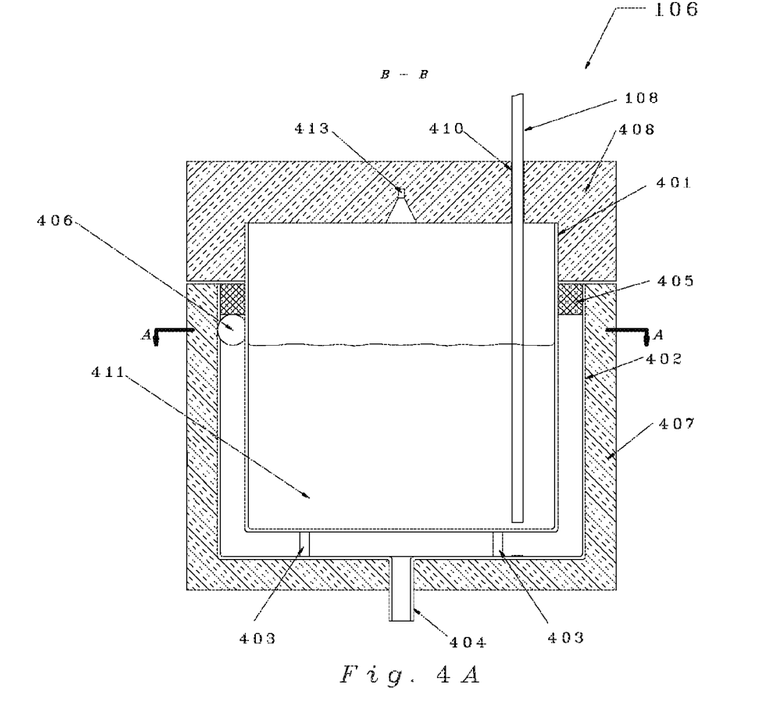
FIG. 4A is sectioned side elevation of the exemplary embodiment of the mix vat of the multi-outlet soft frozen dessert apparatus for a self-service restaurant of the present invention.
Figure 4B:
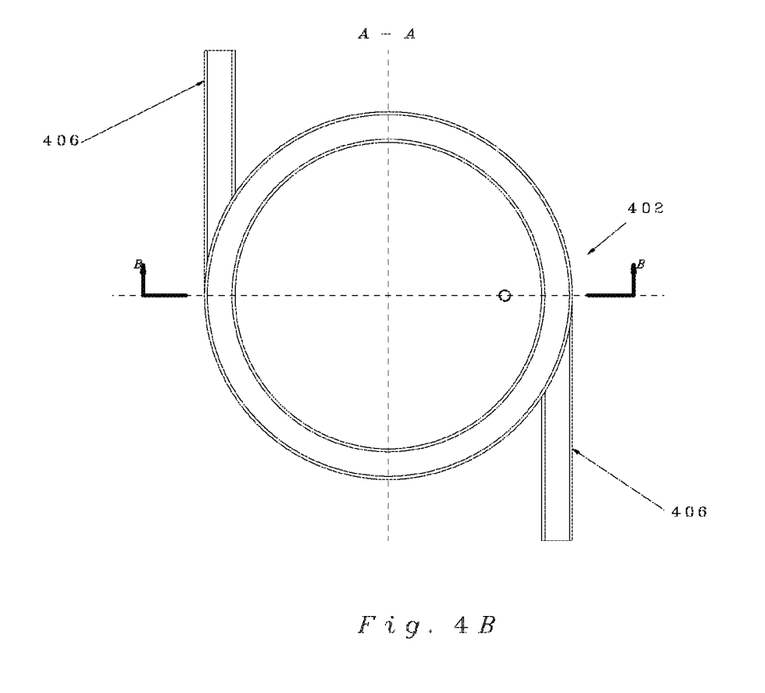
FIG. 4B is a cross-sectional elevation view of the mix vat of FIG. 4A taken along plane AA.

FIG. 4A depicts the axial section of a mix vat (FIG. 1, 106) and FIG. 4B depicts the section AA of the mix vat of multi-outlet soft frozen dessert apparatus (FIG. 1, 100). The mix vat 106 consists of two pots one inside the other. The external pot 402 may have an inside diameter in the approximate range of 15 to 20 mm larger than an outside diameter of the internal pot 401. The internal pot 401 may rest on standoffs 403 which may elevate the internal pot 401 in the range of approximately 15 to 20 mm from the bottom of the external pot 402. A drain assembly 404 may be located at the center of the bottom of the external pot 402. One or more water inlet pipes 406 may be tangentially mounted or welded close to the top of the cylindrical wall of the external pot 402 below the gasket 405 in a way that the axes of the pipes may be essentially parallel to the bottom surface of the external pot 402. The top part of the gap between the two pots may be hermetically sealed by the gasket 405. The cover 408 may have a hole 410 for a feeding tube 108. A temperature sensor (FIG. 1, 121) may be installed close to the bottom end of the feeding tube 108 for measuring the mix temperature.

The chilled or hot water may enter the gap between the pots through the one or more water inlet pipe(s) 406 and flows inside the gap down in a helical pattern and inside the bottom gap where water flows spirally in the direction of the drain. These flow patterns may provide even and efficient cooling of the walls of the internal pot 401. The external surfaces of the external pot 402 may be thermally insulated by insulation 407. The mix vat 106 may be utilized for mixing, cooling the mix, holding the mix, heating the mix or washing solution to the pasteurization temperatures, etc. The symmetrical shape of the mix vat 106 may provide more efficient and unilateral heat transfer between the walls of the internal pot 401 and the bulk of the mix 411 in comparison to a rectangular mix vat (primarily utilized in existing arts) due to a symmetrical convection pattern. Warm liquid at the top may be cooled by the walls of the internal pot 401 cooled by chilled water and drop to the bottom of the internal pot 401 then rise-up at the center area of the internal pot 401 effectively intensifying the convection in the mix. The cover 408 may have non-contact ultrasonic or a microwave level sensor 413 which measures the level of the mix 411 and transmits a signal to the control system 120.

Figure 5:
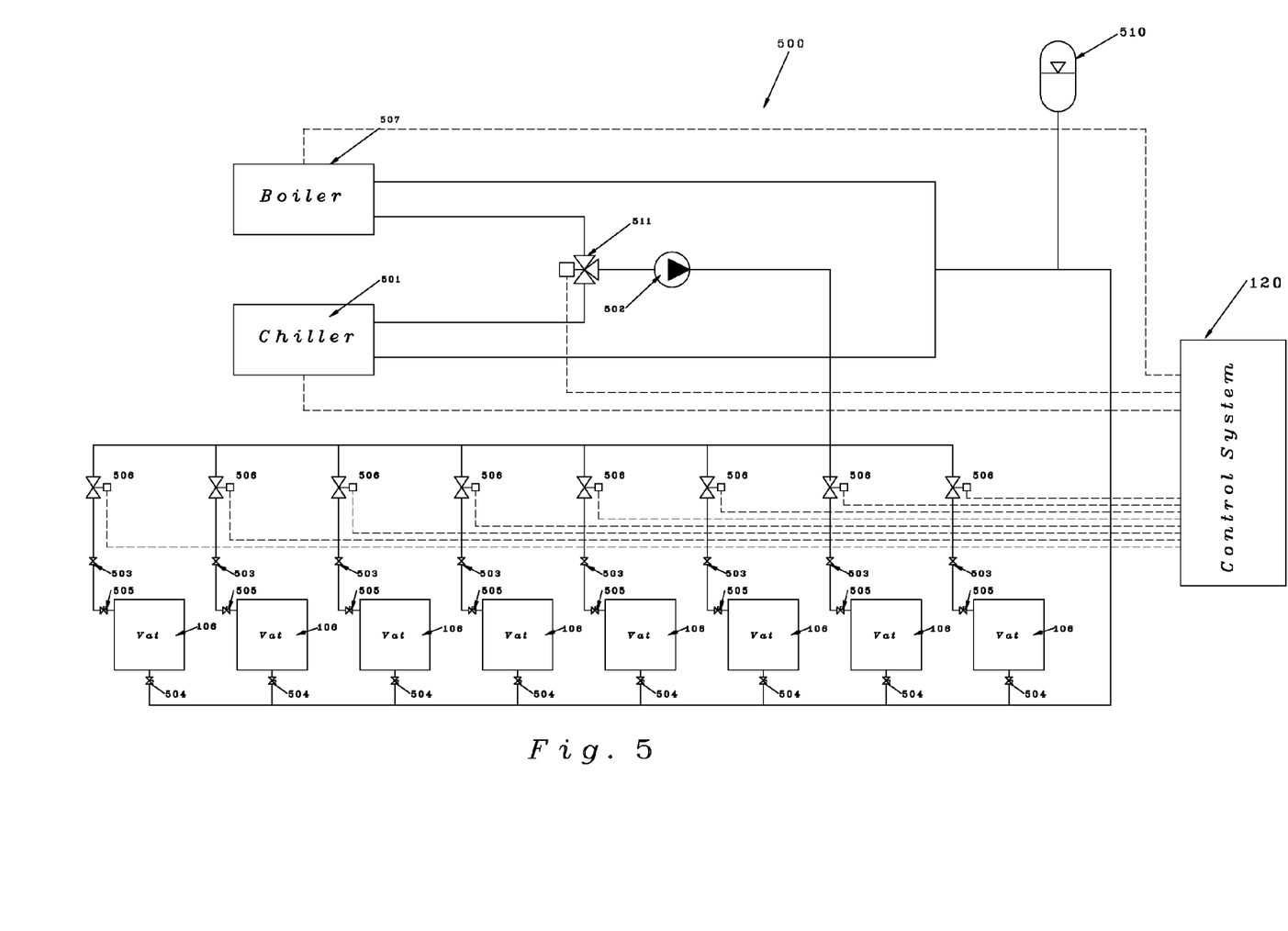
FIG. 5 is an exemplary embodiment of the schematic diagram of the hydraulic cooling and heating of the mix vats of the multi-outlet soft frozen dessert apparatus for a self-service restaurant of the present invention.

FIG. 5 is an exemplary schematic of the hydraulic system 500 which may provide chilled as well as hot water to the mix vat 106 of the multi-outlet soft frozen dessert apparatus (FIG. 1, 100) of the present invention. The hydraulic system 500 may include a chiller 501, a boiler 507, a diverting valve 511, a circulation pump 502, and an expansion tank 510. Each mix vat 106 may have a pair of shut off valves 504,505, an automatic balancing valve 503 and a solenoid control valve 506. The water circulated in the hydraulic system 500 may have some antifreeze added to suppress the freezing temperature in the range of approximately −2° C. to −5° C. This suppression may assure adequate approach temperature to cool the mix in the mix vat in the range of approximately 1° C. to 5° C. (the start freezing temperature of the mix may be usually approximately −1.5° C.).

The multi-outlet soft frozen dessert apparatus 100 may have the following modes of operation: priming, start-up product freezing, product dispensing, product quality maintenance, night time mode and pasteurization or the like.

Priming may take place when an empty freezer cylinder 102 needs to be filled with mix. A pump 109 may be turned-on, the solenoid vent valve 115 may be open and the mix may be starting to flow out of the vat 106 through the tubes 121, 108 and the check valve 108A into the tee 109C. The air may be injected through the precision air valve into the mix stream to provide mix foam of the desired overrun value. The mix foam may enter the suction side of the pump 109 and then may enter the freezer through the pipe 117. When foam mix may fill the entire volume of the cylinder and may enter the vent pipe 113, the optical sensor 114 may detect the presence of the foam mix and the controller 120 may command the valve 115 to close. The pump 109C may keep pumping, increasing the pressure in the cylinder 102. When the pressure measured by the current sensor 128 may reach the set point, the controller 120 may command the pump 109C off.

Start-up freezing mode may be initiated in advance of opening the restaurant with the goal of all of the freezers ready for dispensing products at the opening time. The freezing mode may start by turning on both compressors 302 and the condenser heat exchanger 301. The first two solenoid valves 306 may be commanded to open. The beater motors 103 of the corresponding freezers may be turned on and a freezing process starts. The current sensors 128 may measure the currents of the motors and when the current of a motor may reach the set point corresponded to the desirable viscosity of the product, the corresponding solenoid valve 306 may be commanded off and the valve 306 corresponding to the next freezing cylinder may be commanded on. The process may continue until all cylinders may have frozen product.

During normal operation of the restaurant, a customer may pull the lever 104 of the freezer cylinder of his choice and may start dispensing the product from the cylinder. The sensor 104 associated with the lever may signal the event to the controller 120. The controller 120 may start the pump 109 to refill the cylinder with fresh mix from the vat 106. The controller analyzes if a compressor 302 may be in an off state. If so it may turn on the compressor, the beater motor 103 of the cylinder and the corresponding solenoid valve 306. If both compressors 302 may be in operation, the controller may put the cylinder in the queue to wait until a compressor may be available for the cylinder. When the current measured by the sensor 128 reaches the cylinder pressure set point controller 120 may turn off the pump 109. When current of the motor 103 measured by the current sensor 127 may reach the product viscosity set point, the controller may turn off a compressor and close the solenoid valve 306.

In process of the operation of the restaurant, there may be a situation when a cylinder stays idle for time long enough for the product temperature to rise to the point when the product viscosity may become unsatisfactory and/or the ice crystals start growing thereby fast reducing the quality of the product. To prevent the quality of the product dropping to an unacceptable level, the sensor 121 may constantly measure the product temperature and when it rises above the set point, the controller 120 may analyze if a compressor 302 may be in an off state. If so, it may turn on the compressor, the beater motor 103 of the cylinder and the corresponding solenoid valve 306. If both compressors 302 may be in operation, the controller may put the cylinder in the queue to wait until a compressor may be available for this cylinder. When current of the motor 103 measured by the current sensor 127 may reach the product viscosity set point, the controller may turn off a compressor and may close the solenoid valve 306.

During the night time or other periods when the restaurant may be closed, the mix foam inside the cylinders must be thawed out to prevent ice crystal growth which may lead to unacceptable product quality. At the beginning of such periods, the multi-outlet soft frozen dessert apparatus must be switched to the night mode when the compressors 302 may be turned off, the solenoid valves 307 may be shut down and the motors 103 may be turned on. The beater may start mixing the mix foam and heating it up due to friction inside the mix. When temperature measured by the sensor 121 reach approximately 1° C., the motor 103 may be turned off. The controller 120 may keep monitoring the temperature of the mix in the cylinders. When the temperature in a cylinder may rise to approximately 5° C., the controller may command a compressor 302 on, may open the solenoid valve 306 associated with the cylinder and may turn on the cylinder motor 103. When the temperature measured by the sensor 121 may drop to approximately 1° C., the controller may command the motor, the compressor 302 and the motor 103 off and may close the solenoid valve 306.

There may be essentially two methods to prevent harmful bacteria from growing: periodical (usually once a week) thorough cleaning and/or pasteurization of all the machine parts which may be in contact with the mix or the product. The cylinder cleaning process with use of special cleaning liquids may be very time consuming, may require high levels of personal training and may be expensive. Pasteurization of the cylinders may be achieved by heating the mix inside the cylinder to a temperature essentially above approximately 63° C. for some period of time (the higher the temperature the less time required). To perform the pasteurization of the cylinder, the associated solenoid valve 306 may be shut down and the beater motor 103 and the heater 233 may be turned on. The rotating beater 206 may create in the mix foam in the cylinder a longitudinal rotating pattern: peripheral layers of the foam may move from the back of the cylinder to its front and layers close to the central line of the cylinder may move in the opposite direction. When foam may pass the heater, it heats up and moves the heat away gradually raising the temperature of the whole mass of the mix and all of the parts of the cylinder in contact with the mix. When the temperature sensor 121 detects the pasteurization set point, the controller 120 may turn on the motor 103 and the heater 233 off and may start the pasteurization timer. When the timer may expire, a compressor 302, the valve 306 and the motor 103 may be energized. The refrigerant may flow and evaporate in the cylinder evaporator and may promptly cool the mix foam.

While the present invention has been described in conjunction with the various exemplary embodiments outlined above, it is evident that many alternatives, modifications and variations will be apparent to those skilled in the art. Accordingly, the exemplary embodiments of the present invention, as set forth above, are intended to be illustrative, not limiting. Various changes may be made without departing from the spirit and scope of the present invention.

What is claimed is:

1. A multi-outlet soft frozen dessert apparatus comprising:
   at least two semi-independent stations distributed along a wall, each of the at least two stations are manipulated by a customer to dispense a soft frozen dessert,
   a condenser with a single refrigerant expansion device and a partially expanded refrigerant distributor,
   each of the at least two stations comprising:
   a freezing cylinder mounted on a plurality of brackets attached to the wall, the freezing cylinder is served by the condenser with the single refrigerant expansion device and a partially expanded refrigerant distributor, the freezing cylinder has a solenoid valve installed between the distributor and the freezing cylinder, the condenser has variable capacity utilizing one or more compressors, the wall divides a service area from a customer area of a self-service restaurant, the freezing cylinder includes an inner cylinder and a micro channel evaporator tube made of micro channel tape wound on a mandrel that is forced on the inner cylinder of the freezing cylinder or an evaporator,
   a heating disk is coupled to a back cap of the freezing cylinder,
   the micro channel evaporator tube has headers brazed to both ends of the evaporator tube serving as connectors, the headers are made of cylindrical tubing and have slots for micro channel tube penetration,
   the freezing cylinder having a mix inlet connector for delivering a mix to the freezing cylinder,
   an air vent tube is disposed at the top of the freezing cylinder with the solenoid valve and a light proximity sensor installed on a transparent part for detection of mix foam reaching a top portion of the freezing cylinder,
   wherein variable capacity is achieve by multiple compressors with constant capacity by turning on a different number of compressors or a single variable capacity compressor, the capacity changes or a single variable capacity compressor,
   wherein the capacity changes in steps and if one of the compressors has variable capacity the capacity control is stepless;
   a product dispenser having a dispensing lever and a spigot the product dispenser located in a window-port of the wall;
   a geared motor mounted on a back of the freezing cylinder, the geared motor rotating a beater-scraper inside the freezing cylinder;
   a current sensor measuring a current of the geared motor, the current sensors reports a current measurement to a control system, the current measurement is a function of viscosity of a product, so a value of the viscosity of the product is represented as a value of the current, then the current reaches a set point, the control system issues a command to stop flow of a refrigerant through the microchannel evaporator of the freezing cylinder and stop the geared motor;
   a mix vat located below the freezing cylinder, the mix vat includes a pair of concentric pots, said pair of concentric pots comprising a larger concentric pot and a smaller concentric pot inside of the larger concentric pot, with a gasket between the pair of concentric pots and a drain disposed on a center bottom portion of the larger concentric pot, the mix vat having a thermally insulated cover and a non-contact mix level sensor mounted in a recess of the thermally insulated cover, the mix vat also having a hydraulic system, the hydraulic system selectively provides chilled water or hot water to the mixing vat;
   one or more water inlet pipes tangentially mounted or welded close to the top of a cylindrical wall of the larger pot below the gasket in a way that axes of the pipes are parallel to the bottom surface of the larger pot;
   an insertion type temperature sensor measuring product temperature in a dispensing compartment of the freezing cylinder, and
   a tee in a mix suction line upstream from a pump with a precision air intake regulator installed on a branch and
   a restrictor on the mix suction line upstream from the tee increasing the mix suction line hydraulic resistance and reducing influence of a mix level on overrun value.

2. The multi-outlet soft frozen dessert apparatus according to claim 1, wherein the air vent tube purges air during priming the freezing cylinder.

3. The multi-outlet soft frozen dessert apparatus according to claim 1, wherein the insertion type temperature sensor is coupled at a bottom of a mix suction pipe of the mix vat.

4. The multi-outlet soft frozen dessert apparatus according to claim 1, wherein the proximity sensor signals to the control system when the customer starts and stops dispensing the product.

5. The multi-outlet soft frozen dessert apparatus according to claim 1, wherein the soft frozen dessert is selected from the group consisting of any combination of soft-serve ice cream, ice milk, yogurt, custard, carbonated ice slush drinks and non-carbonated ice slush drinks.

6. The multi-outlet soft frozen dessert apparatus according to claim 1, wherein the evaporator tube is an aluminum alloy micro-channel parallel flow extruded tape inserted inside the headers before brazing.

7. The multi-outlet soft frozen dessert apparatus according to claim 1 wherein an extruded tube is winded on a smaller mandrel and is forced on the inner cylinder greased with heat conducting paste creating contact pressure between the extruded tube and the inner cylinder.

8. The multi-outlet soft frozen dessert apparatus according to claim 1, wherein the window-port has a drip pan.

9. The multi-outlet soft frozen dessert apparatus according to claim 1, wherein a plurality of scraper blades are mounted on a helical part of the beater-scraper in a manner that scrape a thin layer of ice crystals from an internal surface of the inner cylinder and fold the ice crystals inside the mix.

10. The multi-outlet soft frozen dessert apparatus according to claim 1, wherein the water circulated in the hydraulic system has antifreeze added to suppress a freezing temperature in the range of −2° C. to −5° C. to assure adequate approach temperature to cool the mix in the mix vat.

11. The multi-outlet soft frozen dessert apparatus according to claim 1, wherein the mix vat is installed on a dolly for ease of moving the mix vat to fill, wash and maintaining the mix vat.

* * * * *